United States Patent [19]

Kawakami et al.

[11] Patent Number: 5,399,334
[45] Date of Patent: Mar. 21, 1995

[54] PROCESS FOR PRODUCING HYDROGEN PEROXIDE

[75] Inventors: Michiya Kawakami; Yukio Ishiuchi; Hiromitsu Nagashima; Takeshi Tomita, all of Tokyo; Yasushi Hiramatsu, Niigata, all of Japan

[73] Assignee: Mitsubishi Gas Chemical Company, Inc., Tokyo, Japan

[21] Appl. No.: 239,354

[22] Filed: May 6, 1994

[30] Foreign Application Priority Data

May 6, 1993 [JP] Japan .................. 5-105459

[51] Int. Cl.$^6$ .............................................. C01B 15/01
[52] U.S. Cl. ........................................................ 423/584
[58] Field of Search .......................................... 423/584

[56] References Cited

U.S. PATENT DOCUMENTS

| | | |
|---|---|---|
| 3,361,533 | 1/1968 | Hooper . |
| 4,009,252 | 2/1977 | Izumi et al. ............ 423/584 |
| 4,128,627 | 12/1978 | Dyer et al. .............. 423/584 |
| 4,279,883 | 7/1981 | Izumi et al. ............ 423/584 |
| 4,347,232 | 8/1982 | Michaelson ............ 423/584 |
| 4,369,128 | 1/1983 | Moseley et al. ........ 423/584 |
| 4,681,751 | 7/1987 | Gosser ................... 423/584 |
| 4,772,458 | 9/1988 | Gosser et al. .......... 423/584 |
| 5,132,099 | 7/1992 | Hiramatsu et al. .... 423/584 |
| 5,338,531 | 8/1994 | Chuang et al. ........ 423/584 |

FOREIGN PATENT DOCUMENTS

| | | |
|---|---|---|
| 0038700 | 10/1981 | European Pat. Off. . |
| 1366253 | 6/1963 | France . |
| 2615625 | 10/1976 | Germany . |
| 61-17763 | 9/1977 | Japan . |
| 55-18646 | 5/1980 | Japan . |
| 56-47121 | 11/1981 | Japan . |
| 62-29363 | 12/1981 | Japan . |
| 63-30122 | 12/1982 | Japan . |
| 1-23401 | 1/1985 | Japan . |
| 63-156005 | 6/1988 | Japan . |
| 1-192710 | 8/1989 | Japan . |

OTHER PUBLICATIONS

International Publication Number WO93/14025 (Chuang et al), published Jul. 22, 1993.

*Primary Examiner*—Wayne Langel
*Attorney, Agent, or Firm*—Wenderoth, Lind & Ponack

[57] ABSTRACT

This invention provides a process for producing hydrogen peroxide through catalytic reaction of oxygen with hydrogen in an aqueous medium in the presence of a platinum group metal catalyst, in which an organic solvent having only limited solubility with water and less hydrogen peroxide-dissolving ability compared to that of water is caused to be concurrently present in the reactor, and oxygen and hydrogen are catalytically reacted in an aqueous medium in the presence of a water- and organic solvent-insoluble, hydrophilic platinum group metal catalyst, under a low reaction pressure, to form high concentration aqueous hydrogen peroxide solution within a short time.

10 Claims, No Drawings

PROCESS FOR PRODUCING HYDROGEN PEROXIDE

FIELD OF THE INVENTION

This invention relates to an improved process for producing hydrogen peroxide through catalytic reaction of oxygen with hydrogen in a reaction medium. More specifically, the invention relates to a production process of hydrogen peroxide in which hydrogen peroxide concentration in the acquired aqueous solution is increased by the virtue of concurrent presence with water, which is the reaction medium, in the reactor of an inflammable, organic solvent having only limited solubility with water.

PRIOR ART

The main process for industrial production of hydrogen peroxide currently in use is an autoxidation process using an alkylanthraquinone as the medium. This process has problems in that it requires a multiplicity of steps such as the reduction, oxidation, separation by aqueous extraction, purification and concentration, etc., which render the process complex and increase the equipment and operation costs. Further problems reside in loss of alkylanthraquinone due to deterioration and degradation of reducing catalyst.

Aiming at removal of those problems, a variety of production processes other than the above have been attempted, one of which comprises direct hydrogen peroxide production from oxygen and hydrogen, using a catalyst in a reaction medium. Already processes for making hydrogen peroxide from oxygen and hydrogen using platinum group metals as the catalyst have been proposed, with the indication that hydrogen peroxide could be formed at reasonably high concentration levels [Japanese Patent Publication Nos. 47121/1981, 18646/1980 and 23401/1989; and Japanese Patent Application Kokai (Laid-open) No. 156005/1988].

These patent publications and Kokai application disclose processes for making aqueous hydrogen peroxide solutions by conducting the reaction using as the reaction medium an aqueous solution only, which contains an acid and/or a halogen ion. As a process other than those, also disclosed is the one for conducting the reaction using a mixture, in which an organic solvent and water are concurrently present in the reactor. That is, Japanese Patent Publication Nos. 17763/1986, 29363/1987 and 30122/1987 disclose processes for producing hydrogen peroxide comprising causing concurrent presence of an organic solvent having a limited miscibility with water and water in a reactor, whereby contacting hydrogen with oxygen in a bi-phase liquid mixture composed of an aqueous phase and the organic solvent phase. The catalyst used in these processes is homogeneously dissolved in the organic phase, so that the hydrogen peroxide-forming reaction of oxygen with hydrogen is predominantly advanced in the organic phase. Because the hydrogen peroxide formed in the organic phase is extracted into the aqueous phase, eventually an aqueous solution of hydrogen peroxide is obtained.

The concentration levels of hydrogen peroxide obtainable in these processes, however, are not sufficient for practical use. Japanese Patent Application Kokai No. 192710/1989 furthermore discloses a process in which a solvent composed of a fluorine-containing compound and water are used to form a bi-phase system, the reaction being advanced in the organic phase in the presence of a metal catalyst supported on a hydrophobic carrier to separate the formed hydrogen peroxide into the aqueous phase at high concentration levels. This process however has such defects that the useful kinds of the catalyst carriers are subject to the very substantial limitation that they must be hydrophobic, and that the selectivity of the reaction is not necessarily high. Whereas, application of the acid and promotors, whose addition to an aqueous medium is disclosed to be effective to improve selectivity of the reaction in prior art references such as Japanese Patent Application Kokai No. 156,005/1988, to the organic solvent is not feasible, as they render effective performance of the reaction difficult. U.S. Pat. No. 3,361,533 discloses a process having an organic solvent containing oxygen atoms concurrently present with water in a reactor, but the organic solvent used in said process is miscible with water at optional ratios, e.g., an alcohol. According to this production process, the resultant aqueous hydrogen peroxide solution is a mixture with the organic solvent. Thus the process is subject to the defect that a post-treatment to separate and remove the organic solvent is indispensable after the reaction, for obtaining aqueous hydrogen peroxide solution.

In the art of producing hydrogen peroxide through catalytic reaction of oxygen with hydrogen in a reaction medium, it has heretofore been practiced, furthermore, to raise partial pressures of hydrogen and oxygen, with the view to obtain hydrogen peroxide at a high concentration by the reaction of short duration. However, in order to avoid explosion hazard of a gaseous mixture of hydrogen and oxygen, their blend ratio is restricted, and for increasing their partial pressure levels, the total pressure of the reaction system must be increased. When the total reaction pressure is thus increased, special care must be taken for operational safety. This simultaneously causes an economical problem that construction costs of the production equipments amount high.

Problems to be Solved by the Invention

The object of the present invention is to provide a process for producing hydrogen peroxide, which enables acquisition of high concentration aqueous hydrogen peroxide solution within a short reaction time, through a catalytic reaction of oxygen with hydrogen in an aqueous medium, under a relatively low pressure.

In a process for catalytically producing hydrogen peroxide from oxygen and hydrogen, when water alone is used as the reaction medium, concentration of the aqueous hydrogen peroxide solution resulting from the reaction depends on the amount of the water which is used as the reaction medium. Whereas, an attempt to reduce the amount of water for the purpose of further increasing hydrogen peroxide concentration in the formed aqueous solution aggravates the mixing state within the reactor to reduce the reaction rate, rendering it impossible to acquire high concentration aqueous hydrogen peroxide solution.

Means to Solve the Problems

The present inventors have engaged in continuous studies in search of a process for catalytically producing hydrogen peroxide from oxygen and hydrogen, in which high concentration aqueous hydrogen peroxide solution can be obtained in a short reaction time under lower reaction pressure. As the result we discovered that the above object can be accomplished by causing concurrent presence in the reactor, with water which is the reaction medium, of an inflammable organic solvent having only limited solubility with water and, furthermore, having sufficiently lower hydrogen peroxide dissolving power compared to that of water. Based on this discovery the present invention has been completed.

That is, the present invention provides a process for producing hydrogen peroxide through catalytic reaction of oxygen with hydrogen in an aqueous medium, the process being characterized in that an organic solvent having only limited solubility with water and less hydrogen peroxide dissolving ability than that of water is caused to be concurrently present with water in the reactor.

According to the present invention, it is made possible to reduce the amount of water which is the reaction medium, while maintaining favorable state of mixing inside the reactor and without inviting reduction in the reaction rate, whereby enabling to raise concentration level of hydrogen peroxide in the resultant solution. According to the invention, an organic solvent which is inert to the reaction and has only limited solubility with water is added to the reactor, in an amount equalling to that of the reduced water, whereby maintaining the intended state of mixing within the reactor. A desired level of the reaction rate can consequently be maintained, and still more, due to the reduction of water in an amount corresponding to that of the added organic solvent in the reactor, the hydrogen peroxide concentration in the resultant aqueous solution increases in consequence.

While the precise reaction mechanism is not fully known yet, presumably the stirring power finely divides and disperses the water or organic solvent, and in either of the cases the water in which the catalyst is uniformly dispersed in appearance flows throughout the whole reactor. Furthermore, because the total amount of the fluid is maintained constant, the favorable gas-liquid mixed state can be maintained.

Moreover, generally solubility of hydrogen and oxygen in organic solvent is higher than that in water. Hence, the liquid-to-liquid migration of substances occurring as the hydrogen and oxygen, which are dissolved in the organic solvent, migrate through the interfaces with water also contributes to enhance the reaction rate.

Still in addition, use of the organic solvent reduces surface tension of the liquid phase and minimizes bubble sizes of oxygen and hydrogen gases, whereby increasing the contacting efficiency of the oxygen and hydrogen gases with the liquid phase.

The organic solvent useful for the present invention is subject to no limitation in kind, so long as it has only limited solubility with water and less hydrogen peroxide dissolving ability. A preferred solvent satisfies the following requirements, i.e., (1) it has only limited solubility with water; that is, the solubility of the solvent in water is not higher than 0.05 g-solvent/g-water, preferably not higher than 0.001 g-solvent/g-water; and the solubility of water in the solvent is not higher than 0.5 g-water/g-solvent, preferably not higher than 0.01 g-water/g-solvent: (2) its hydrogen peroxide-dissolving ability is sufficiently low compared to that of water; that is, the solubility of hydrogen peroxide is not higher than 0.5 g-$H_2O_2$/g-solvent, preferably not higher than 0.01 g-$H_2O_2$g-solvent: (3) it has viscosity not largely differing from that of water; that is, 0.2–50 centipoise, preferably 0.5–20 centipoise: (5) it is inflammable; that is, it has flash point of no lower than 80° C., preferably no lower than 120° C.: and (6) it has high dissolving ability of oxygen and hydrogen.

Examples of organic solvent which satisfies these requirements include halogenated organic compounds such as o-chlorobenzaldehyde, octyl bromide, 1-bromo-3propane chloride. As preferred examples, hydrocarbons substituted with at least two halogen atoms such as fluorine, chlorine and bromine may be named, while still more preferred examples are hydrocarbons substituted with at least three halogen atoms, such as perchlorocarbon and perfluorocarbon compounds. Specific examples of perchlorocarbon compounds include trichloroethane and perchloroethylene. The most preferred are hydrocarbons substituted with at least three fluorine atoms, specific examples of which include Fluorinert ® FC-77, Fluorinert ® FC-43 and Fluorinert ® FC-70, the commercial products of Sumitomo 3M Co. Ltd.

Whereas, when the amounts of the total liquid (sum of organic solvent and water) and the catalyst are maintained constant while the ratio of the organic solvent to the water is varied, and the reaction is carried out under otherwise identical conditions, the total hydrogen consumption in the reaction is substantially unchanged.

Hence, when the reaction medium consists of such an organic solvent and water at a ratio of 1:1, the hydrogen peroxide concentration in the solution formed after the reaction becomes about two times that in the case where water alone is used as the reaction medium. When the ratio between the organic solvent to water is 2:1 in the reaction medium, the hydrogen peroxide concentration in the formed aqueous solution, therefore, becomes about three times that in the case where water alone is used as the reaction medium. In practice, however, the reaction rate and selectivity cannot be completely free from the influence of hydrogen peroxide concentration in the aqueous solution, and in particular when a high concentration aqueous hydrogen peroxide solution is to be obtained, the concentration after the reaction is apt to deviate from the exact correspondence to the volume ratio between the organic solvent and water. From the standpoint of economy, therefore, the volume ratio of the organic solvent to water in the reactor is selected from the range of 5:95 to 95:10, preferably 30:70 to 90:10, more preferably 50:50 to 0:20.

According to the invention in which formation of high concentration aqueous hydrogen peroxide solution is intended, it is permissible to add a stabilizer of hydrogen peroxide to the water which is the reaction medium, with the view to inhibit decomposition. As the stabilizer, known water-soluble stabilizers can be used, specific examples including aminotri(methylenephosphonic acid), 1-hydroxyethylidene-1,1-diphosphonic acid, methylenediaminetetra(methylenephosphonic acid) and their sodium salts, phosphoric acid, sulfuric acid, nitric acid, sodium pyrophosphate, etc. The amount of use of such a stabilizer is variable depending on the kind of the stabilizer selected and the concentration of aqueous hydrogen peroxide solution, while normal amount of addition of such a stabilizer in terms of its concentration in water is 1 to 1,000 ppm, preferably 5 to 100 ppm.

As the catalyst to be used in the invention, platinum group metals such as palladium, platinum etc. are preferred. The form of the catalyst is not critical so long as it is substantially hydrophilic, which may be pellet or powder. The term, hydrophilic catalyst, to be used in the invention signifies that the catalyst has the property to predominantly disperse in an aqueous phase, when it is added to a reaction system wherein two phases, viz., aqueous phase and organic phase, are present. The hydrophilic catalyst includes a sole platinum group metal catalyst and, preferably, a platinum group metal catalyst supported on a hydrophilic carrier. Such a catalyst supported on a hydrophilic carrier is prepared by supporting a platinum group metal such as palladium or platinum on commonly used catalyst carrier, for example, silica, titania, alumina, magnesia, zirconia, celia, zeolite or activated carbon, etc. in their commonly used form. Also a platinum group metal such as palladium or platinum on a resin carrier, e.g., styrene-divinylbenzene copolymer resin, vinyl chloride-vinyl acetate copolymer resin or porous Teflon resin, which has a hydrophilic surface can be used. The resin carrier is given the hydrophilic surface in advance of the reaction through a treatment comprising immersing the catalyst in a water-soluble organic solvent such as methyl alcohol, ethyl alcohol, etc. and thereafter substituting the solvent with water. The catalyst to be used in the present invention may comprise 0.01 to 30%, preferably 0.1 to 10% platinum group metal supported on a carrier such as alumina, silica, titania, magnesia, zirconia, celia, zeolite, activated carbon, etc. The amount of the catalyst for use is normally 1 to 300 grams, preferably 2 to 150 grams, per liter of the reaction medium. It is necessary that the catalyst be insoluble in both the organic solvent and water. Because the reaction takes place in water-phase according to the present invention, a promotor (e.g. halogen ion) or an acid such as sulfuric or hydrochloric acid, which are effective for increasing selectivity of the reaction can be added to the water, which is the reaction medium, at an optional ratio. In consequence of such an addition, high concentration aqueous hydrogen peroxide solution can be effectively obtained through the process of this invention. That is, the present invention is applicable also to those various processes which have heretofore been developed for catalytic production of hydrogen peroxide from oxygen and hydrogen, in which system water is used as the reaction medium. By applying the process of this invention, high concentration aqueous hydrogen peroxide solution can be effectively obtained.

As the reaction apparatus for practicing the present invention, generally an agitation type reactor is used, but bubbling column or fluidized bed-type reactor or the like can also be used without limitation, so long as the apparatus can provide the power to sufficiently disperse the organic solvent and water. The hydrogen peroxide production according to the present invention, furthermore, is normally practiced by contacting oxygen and hydrogen with the catalyst, in the optional presence of an inert gas such as nitrogen which has no adverse effect on the intended reaction, under the conditions as reaction pressure ranging from $3 \times 10^7$–$1.5 \times 10^9$ Pa (3–150 kg/cm$^2$.G), preferably $5 \times 10^7$–$1 \times 10^9$ Pa (5–100 kg/cm$^2$.G), most preferably $8 \times 10^7$–$5 \times 10^8$ Pa (8–50 kg/cm$^2$.G), at reaction temperature of 0° C. –80° C., preferably 5°–50° C., and for a time ranging from 30 minutes to 6 hours.

Effect of the Invention

According to the invention, a process for producing hydrogen peroxide is provided, which enables acquisition of high concentration aqueous hydrogen peroxide solution through a reaction for only a short time in which oxygen and hydrogen are allowed to catalytically react in an aqueous medium at a low reaction pressure. Consequently, the construction cost for the equipment is reduced, and it is made possible to effectively produce hydrogen peroxide.

EXAMPLES

Hereinafter the invention is explained in further details with reference to working Examples and Comparative Examples, in which the reacted amount of hydrogen is determined by chromatographic analysis of composition of the gas at the exit of the reactor used. Furthermore, concentration of hydrogen peroxide in the reaction medium is measured by titration method with potassium permanganate solution which is rendered acidic by addition of sulfuric acid.

Example 1

A reaction for producing hydrogen peroxide from oxygen and hydrogen was conducted in the following manner.

A 6-liter capacity SUS 316 stainless steel autoclave with a cooling jacket was charged with 2075 ml of Fluorinert ® FC-77 (commercial name of a perfluoro hydrocarbon manufactured by Sumitomo 3M Co. Ltd.) as a perfluoro hydrocarbon. Then 692 ml of an aqueous solution, in which sodium brominate concentration was adjusted to 0.5 mmol/liter and sulfuric acid concentration, to 0.1 mol/liter, and 5 grams of a commercial 5 wt. % Pd-on-titania catalyst (manufactured by N. E. Chemcat Corp.) was suspended, was added to the autoclave, to make the total amount of the reaction medium 2767 ml. The autoclave was closed, and air was introduced thereinto at a rate of 959 Nl/hr. The pressure inside the autoclave was thus raised up to $9 \times 10^7$ Pa (9 kg/cm$^2$.G) with a pressure control valve. While continuously passing the air, agitation was started to a rate of 1500 rpm, while maintaining the reaction pressure of $9 \times 10^7$ Pa (9 kg/cm$^2$.G) and the reaction temperature, at 10° C. After the reaction conditions were stabilized, gaseous hydrogen was passed at a rate of 60 Nl/hr for 30 minutes, to effect the reaction. After the 30 minutes' reaction, the hydrogen peroxide concentration in water was 2.48% by weight, total amount of reacted hydrogen was 0.71 mol, and the hydrogen selectivity was 71%. The hydrogen selectivity was calculated by the equation below:

*Hydrogen selectivity (%)=[(amount of hydrogen peroxide formed of the reaction mol)−(theoretical amount of hydrogen peroxide to be formed from the hydrogen consumption mol)]×100*

Fluorinert ® FC-77 has solubility in water not higher than 0.01 mg/g-water, dissolving power of hydrogen peroxide not higher than 0.015 mg-H$_2$O$_2$/ g-solvent, a viscosity of 1.4 centipoise, and has no flash point.

Example 2

Example 1 was repeated except that the amount of Fluorinert FC-77 was reduced to 1845 ml and that 922 ml of an aqueous solution of identical composition with that used in Example 1, containing as suspended therein 5 g of a commercial 5 wt. % Pd-on-titania catalyst (manufactured by N. E. Chemcat Corp.) was used. After 30 minutes' reaction, hydrogen peroxide concentration in the water was 1.99% by weight, total amount of reacted hydrogen was 0.74 mol, and the hydrogen selectivity was 73%.

Example 3

Example 1 was repeated except that the amount of Fluorinert FC-77 was reduced to 1384 ml and that 1384 ml of an aqueous solution of identical composition with that used in Example 1, containing as suspended therein 5 g of a commercial 5 wt. % Pd-on-titania catalyst (manufactured by N. E. Chemcat Corp.) was used. After 30 minutes' reaction, hydrogen peroxide concentration in the water was 1.42% by weight, total amount of reacted hydrogen was 0.76 mol, and the hydrogen selectivity was 76%.

Comparative Example 1

Example 1 was repeated except that Fluorinert FC-77 was not used and that 2767 ml of an aqueous solution of identical composition with that used in Example 1, containing as suspended therein 5 g of a commercial 5% by weight Pd-on-titania catalyst (manufactured by N. E. Chemcat Corp.) was used. After termination of 30 minutes' reaction, hydrogen peroxide concentration in the water was 0.78% by weight, total amount of reacted hydrogen was 0.80 mol, and the hydrogen selectivity was 80%.

Example 4

Example 1 was repeated except that 20 g of a commercial 5 wt. % Pd-on-alumina catalyst (manufactured by N. E. Chemcat Corp.) was used. After termination of the 30 minutes' reaction, hydrogen peroxide concentration in the water was 2.37% by weight, total amount of reacted hydrogen was 0.70 mol, and the hydrogen selectivity was 69%.

Comparative Example 2

Example 4 was repeated except that Fluorinert FC-77 was not used and that 2767 ml of an aqueous solution of identical composition with that used in Example 4, containing 20 g of a commercial 5 wt. % Pd-on-alumina catalyst (manufactured by N. E. Chemcat Corp.) was used. After termination of 30 minutes' reaction, the hydrogen peroxide concentration in the water was 0.79 wt. %, total amount of reacted hydrogen was 0.79 mol, and the hydrogen selectivity was 81%.

Example 5

Example 1 was repeated except that the amount of Fluorinert FC-77 was increased to 3458 ml to make the total amount of the reaction medium 4150 ml. After termination of the 30 minutes' reaction, hydrogen peroxide concentration in the water was 3.51% by weight, the total amount of reacted hydrogen was 1.05 mols, and the hydrogen selectivity was 68%.

Comparative Example 3

Example 5 was repeated except that Fluorinert FC-77 was not used and that 4150 ml of an aqueous solution of identical composition with that used in Example 5, containing as suspended therein 5 g of a commercial 5 wt. % Pd-on-titania catalyst (manufactured by N. E. Chemcat Corp.) was used. After the 30 minutes' reaction, hydrogen peroxide concentration in the water was 0.80% by weight, the total amount of reacted hydrogen was 1.19 mols and the hydrogen selectivity was 82%.

Example 6

Example 5 was repeated except that the reaction was continued for 1.5 hours. After termination of 1.5 hours' reaction, hydrogen peroxide concentration in the water was 7.66% by weight, the total amount of reacted hydrogen was 2.84 mols, and the hydrogen selectivity was 55%.

Comparative Example 4

Example 6 was repeated except that Fluorinert FC-77 was not used, and that 4150 ml of an aqueous solution of identical composition with that used in Example 6, containing as suspended therein 5 g of a commercial 5 wt. % Pd-on-titania catalyst (manufactured by N. E. Chemcat Corp.) was used. After the 1.5 hours' reaction, hydrogen peroxide concentration in the water was 1.92% by weight, the total amount of reacted hydrogen was 3.01 mols and the hydrogen selectivity was 78%.

Example 7

Example 1 was repeated except that aminotri (methylenephosphonic acid) was added to the aqueous solution at a concentration of 75 ppm. After the 30 minutes' reaction, hydrogen peroxide concentration in the water was 2.62% by weight, the total amount of reacted hydrogen was 0.65 mol, and the hydrogen selectivity was 82%.

Example 8

Example 1 was repeated except that Fluorinert FC-77 was replaced by perchloroethylene (manufactured by Kanto Kagaku K. K.). After the 30 minutes' reaction, hydrogen peroxide concentration in the water was 2.44% by weight, the total amount of reacted hydrogen was 0.68 mol, and the hydrogen selectivity was 73%.

The perchloroethylene used has a solubility in water not higher than 0.01 mg/g-water, a dissolving power of hydrogen peroxide not higher than 0.015 mg-$H_2O_2$/g-solvent, a viscosity of 0.88 centipoise, and has no flash point.

Example 9

An aromatic adsorbent resin manufactured and sold by Mitsubishi Kasei Kogyo Corp. under the commercial name of HP20 (styrene-divinylbenzene copolymer; particle size, 0.2–1 mm; specific surface area, 605 $m^2$/g; true specific gravity, 1.01; water content, 56.3 wt. %) was washed with methanol and 30% aqueous hydrogen peroxide solution, and dried in vaquo. The dried resin was swollen with chloroform, impregnated with palladium acetate/chloroform solution, vacuum-dried, and reduced with hydrogen in gaseous phase at 100° C. to provide a hydrophobic 1% Pd/HP20 catalyst. The catalyst was rendered hydrophilic by the following method: the hydrophobic 1% Pd/HP20 was washed with methanol, causing sufficient swelling to wet inside of the pores; then the methanol was substituted with a large quantity of water and the system was filtered to provide a hydrophilic 1% Pd/HP20 catalyst.

Example 1 was repeated except that 40 g of the above catalyst was used instead of the Pd-on-titania catalyst. The catalyst before initiation of the reaction dispersed in the aqueous phase. After the 30 minutes' reaction, hydrogen peroxide concentration in the water was 2.04% by weight, the total amount of reacted hydrogen was 0.50 mol, and the hydrogen selectivity was 83%. After termination of the reaction, the catalyst still remained in the aqueous phase.

Comparative Example 5

Example 9 was repeated except that the hydrophobic 1% Pd/HP20 catalyst as prepared by the method described in Example 9 was used without the preceding treatment for rendering it hydrophilic. The catalyst before initiation of the reaction dispersed in the Fluorinert FC-77 phase. After the 30 minutes' reaction, hydrogen peroxide concentration in the water was 0.62% by weight, the total amount of reacted hydrogen was 0.35 mol, and the hydrogen selectivity was 36%.

What we claimed is:

1. A process for producing hydrogen peroxide through catalytic reaction of oxygen with hydrogen in an aqueous medium, the process being characterized in that an organic solvent having only limited solubility with water and less hydrogen peroxide dissolving ability than that of water is caused to be concurrently present with the aqueous medium in a reactor, and oxygen and hydrogen are catalytically reacted in the aqueous medium, using a water- and organic solvent-insoluble, hydrophilic platinum group metal catalyst.

2. A process for producing hydrogen peroxide according to claim 1, in which the platinum group metal catalyst is a palladium or platinum catalyst which is insoluble in organic solvent and in water, and is hydrophilic.

3. A process for producing hydrogen peroxide according to claim 1, in which the organic solvent is a hydrocarbon substituted with at least two halogen atoms.

4. A process for producing hydrogen peroxide according to claim 3, in which the organic solvent is a hydrocarbon substituted with at least three fluorine atoms.

5. A process for producing hydrogen peroxide according to claim 1, in which the organic solvent is a liquid having an flash point not lower than 80° C.

6. A process for producing hydrogen peroxide according to claim 1, in which the volume ratio of the water to the organic solvent in the reaction medium ranges from 5:95–95:5.

7. A process for producing hydrogen peroxide according to claim 1, in which the aqueous medium is an aqueous solution containing halogen ion and/or acid.

8. A process for producing hydrogen peroxide according to claim 1, in which the aqueous medium is an aqueous solution containing a stabilizer for hydrogen peroxide.

9. A process for producing hydrogen peroxide according to claim 8, in which the stabilizer for hydrogen peroxide is selected from the group consisting of aminotri(methylenephosphonic acid), 1-hydroxyethylidene-1,1-diphosphonic acid, ethylenediaminetetra(methylenephosphonic acid), or their salts, and sodium pyrophosphate.

10. A process for producing hydrogen peroxide according to claim 1, in which oxygen and hydrogen are reacted in optional presence of an inert gas, in a reaction medium and in the presence of a catalyst, at a reaction temperature ranging from 0° C. to 50° C. under a reaction pressure of $3 \times 10^7 – 1.5 \times 10^9$ Pa (3–150 kg/cm$^2$.G).

* * * * *